United States Patent
Herting (10) Patent No.: US 12,539,572 B2
(45) Date of Patent: Feb. 3, 2026

(54) METHOD FOR POSITIONING A WORKPIECE AND APPARATUS THEREFOR

(71) Applicant: Torsten Herting, Grindelwald (CH)

(72) Inventor: Torsten Herting, Grindelwald (CH)

(*) Notice: Subject to any disclaimer, the term of this patent is extended or adjusted under 35 U.S.C. 154(b) by 1183 days.

(21) Appl. No.: 17/278,092

(22) PCT Filed: Sep. 19, 2019

(86) PCT No.: PCT/EP2019/075238
§ 371 (c)(1),
(2) Date: Mar. 19, 2021

(87) PCT Pub. No.: WO2020/058442
PCT Pub. Date: Mar. 26, 2020

(65) Prior Publication Data
US 2021/0347001 A1 Nov. 11, 2021

(30) Foreign Application Priority Data
Sep. 20, 2018 (EP) .................................. 18195720

(51) Int. Cl.
B23Q 15/12 (2006.01)
A61C 13/00 (2006.01)
B23Q 3/18 (2006.01)

(52) U.S. Cl.
CPC .......... *B23Q 15/12* (2013.01); *A61C 13/0004* (2013.01); *B23Q 3/18* (2013.01)

(58) Field of Classification Search
CPC ............ A61C 13/0004; A61C 13/0009; A61C 13/0022; A61C 13/0027; B23Q 15/12; B23Q 3/18
See application file for complete search history.

(56) References Cited

U.S. PATENT DOCUMENTS

| 5,347,454 A * | 9/1994 | Mushabac ......... G05B 19/4207 |
|---|---|---|
| | | 433/214 |
| 11,559,380 B2 * | 1/2023 | Geier .................. A61C 13/087 |

(Continued)

FOREIGN PATENT DOCUMENTS

| CN | 1310656 A | 8/2001 |
|---|---|---|
| CN | 101626737 A | 1/2010 |

(Continued)

OTHER PUBLICATIONS

International Search Report for PCT/EP2019/075238 dated Apr. 17, 2020, 10 pages.

(Continued)

Primary Examiner — Nicholas D Lucchesi
(74) Attorney, Agent, or Firm — NIXON & VANDERHYE (57) ABSTRACT

A method for precisely positioning a dental prosthesis workpiece in a machine tool includes creating an impression on a part positionable with respect to the tool in a known position in the tool, allowing arrangement of the workpiece precisely on the impression. The device includes a blank and a counter on which an impression is formed. The blank and the counter have key structures so they can be separated from each other and reproducibly reconnected in the same arrangement. An alternative on a computational basis is to provide the workpiece with referencing bodies, to determine their positions by scanning the workpiece, machining steps being generated based on the scan, and to scan the workpiece in a tool on a blank provided with key structures whose tool coordinates are known to determine the position of the workpiece in the tool both in terms of tool and construction system coordinates.

8 Claims, 6 Drawing Sheets

(56) References Cited

U.S. PATENT DOCUMENTS

| | | |
|---|---|---|
| 2009/0220916 A1 | 9/2009 | Fisker |
| 2010/0035209 A1 | 2/2010 | Jang |
| 2011/0080476 A1 | 4/2011 | Dinauer et al. |
| 2012/0143369 A1 | 6/2012 | Prust |
| 2013/0167380 A1 | 7/2013 | Balshi |
| 2013/0228611 A1 | 9/2013 | Byars |
| 2014/0178828 A1 | 6/2014 | Jo |
| 2014/0205969 A1 | 7/2014 | Marlin |
| 2015/0245892 A1 | 9/2015 | Grobbee |
| 2015/0342711 A1 | 12/2015 | Grobbee |
| 2018/0042705 A1 | 2/2018 | Howe |
| 2019/0053881 A1 | 2/2019 | Grobbee et al. |
| 2019/0374319 A1 | 12/2019 | Chiou et al. |
| 2020/0055254 A1 | 2/2020 | Geisen |

FOREIGN PATENT DOCUMENTS

| | | |
|---|---|---|
| CN | 101940503 A | 1/2011 |
| CN | 102554711 A | 7/2012 |
| CN | 103229287 A | 7/2013 |
| CN | 103561677 A | 2/2014 |
| CN | 104116569 A | 10/2014 |
| DE | 103 36 390 | 3/2005 |
| DE | 10 2016 222 210 | 5/2018 |
| DE | 20 2018 104 325 U1 | 9/2018 |
| EP | 0637482 A1 | 2/1995 |
| EP | 1088620 A1 | 4/2001 |
| EP | 1 195 226 A1 | 4/2002 |
| EP | 2 915 503 A1 | 9/2015 |
| EP | 3 443 932 A1 | 2/2019 |
| JP | S6016345 A | 1/1985 |
| JP | H07148634 A | 6/1995 |
| JP | H1058286 A | 3/1998 |
| KR | 20110092770 A | 8/2011 |
| WO | 2012/079637 | 6/2012 |
| WO | 2018/009518 A1 | 1/2018 |

OTHER PUBLICATIONS

Written Opinion of the ISA for PCT/EP2019/075238 dated Apr. 17, 2020, 10 pages.
International Search Report for PCT/EP2020/055343 dated May 7, 2020, 4 pages.
Written Opinion of the ISA for PCT/EP2020/055343 dated May 7, 2020, 15 pages.
Li et al., "Electromachining technology for complex surface of aeroengineintegral thin-wall structure", Aeronautical Manufacturing Technology, Feb. 1, 2018, vol. 61, No. 3, pp. 41-59.
Search Report, issued in Chinese Patent Application No. 201980061689.X dated Feb. 20, 2024.
Tan et al., "An experimental study on the effect of different optical impression methods on marginal and internal fit of all-ceramic crowns", West China Journal of Stomatology, vol. 28, No. 1, Feb. 20, 2010, pp. 29-33.

\* cited by examiner

METHOD FOR POSITIONING A WORKPIECE AND APPARATUS THEREFOR

CROSS-REFERENCE TO RELATED APPLICATIONS

This application is the U.S. national phase of International Application No. PCT/EP2019/075238 filed Sep. 19, 2019 which designated the U.S. and claims priority to EP 18195720.0 filed Sep. 20, 2018, the entire contents of each of which are hereby incorporated by reference.

BACKGROUND OF THE INVENTION

Field of the Invention

The present invention relates to a method for positioning a workpiece. It further relates to a device for positioning a workpiece.

The preferred field of application and the starting point of the present invention is the manufacture and subsequent modification of dental prostheses. However, the invention is applicable to the manufacture generally of workpieces and in particular to their subsequent machining, such as engine parts, car parts, aircraft parts, ship parts, machine parts, model making parts and other parts, tools, etc.

Description of the Related Art

A dental prosthesis is manufactured in several steps. For example, the prosthesis base is milled first. Then the tooth layer is bonded to the base. To this end, the prosthesis must be removed from the milling machine and thus loses its position. After reattaching, re-referencing is necessary in each case.

According to the state of the art, this is currently possible with mechanical measuring probes, which involve the following problems, among others:

The probe arm or similar must be firmly connected to the machine.
The probe system must be calibrated,
is sensitive to temperature fluctuations,
requires appropriate space in the machine,
is technically complex and
is costly Existing dental prostheses need to be reworked and adjusted for various reasons. A common reason is a change of the jaw, which requires an adjustment of the dental prosthesis by relining, i.e. filling of resulting cavities between the gingiva and the prosthesis. Teeth and/or the prosthesis base also need to be modified after the removal of one or more teeth. Retaining elements such as clasps, implant abutments, attachments must be modified and/or incorporated. In the course of its manufacture, a new dental prosthesis must be tried on, test worn, as the case may be, and corrected according to the patient's feedback.

For modifications to dental prostheses, subtractive (grinding, milling) and additive machining processes (3D printing, in particular metal laser melting processes) are being used. In all of these processes, the prosthesis (or a workpiece in general) must be precisely inserted in a defined position in the workpiece holder of the respective machine tool. However, such positioning with the required accuracy (usually in the order of 0.1 mm or better) is very complex and time-consuming. This problem is due to the fact that machine tools perform machining operations according to data originating from construction software (CAM system) or another source while the relationship of the position of the coordinate system of the machine tool and of the coordinate system of the CAM system, the construction coordinate system, relative to each other is unknown.

Regularly an image of the workpiece, e.g. before and after the intended machining, exists in the construction coordinate system, and specifically in this coordinate system the machining steps (tool movements, etc.) are defined. For the actual machining steps, especially in the case of automated, computer-controlled execution, the coordinates of the machining steps must be mapped with correspondingly high precision from the construction coordinate system into the coordinate system resulting from the real position of the workpiece in the machine tool, and this moreover in a coordinate system in which the machine tool performs the machining steps. Thus, another problem is that this mapping also depends on the spatial arrangement of the workpiece in the machine tool.

SUMMARY OF THE INVENTION

Therefore, it is an object of the present invention to simplify the accurate positioning of a workpiece in a machine tool.

A corresponding method is disclosed, as are preferred embodiments of the method and devices for use in this method.

Both the process and the device take advantage of the fact that it is possible with little effort to produce a duplicate having the shape of the particular workpiece from a low-cost material on the basis of the existing design, i.e. from digital data for controlling a numerically controlled (computer-controlled) machine tool. The duplicate is produced on a base or platform and forms a so-called blank with the latter. An impression of the duplicate is made on a counter piece, the so-called counter. The impression can be limited to selected areas of the duplicate ("reference zones") which are sufficiently significant overall so that when the duplicate is removed and placed back on the impression, the duplicate or, in a later step, the original of the workpiece reproducibly engages in the same position on the impression. In the case of a dental prosthesis, these defining points can be sufficiently large surface sections of the teeth, i.e. their occlusal surfaces, but also the underside of the prosthesis or its outer surfaces. Of course, if a treatment is intended on the teeth, these are not available for these reference zones. In addition to the reference zones, the duplicate may include any further sections of the workpiece or even the complete workpiece, provided that these additional sections do not interfere with the intended machining steps.

The counter has a positioning section which is preferably located outside the area covered by the workpiece. One or more key structures are arranged in this positioning section. The key structures are designed in such a way that they allow the counter to be precisely mounted in a predetermined position on a base, usually a blank. The counter pieces to the key structures on the counter, the blank key structures, are produced by the respective machine tool. Their position is therefore known by the coordinate system of the machine tool. Thus, the position of the key structures on the counter relative to the impression of the reference of the workpiece, in particular a dental prosthesis, is also known. Overall, it is thus possible to precisely define the position of a workpiece (a dental prosthesis) attached to the blank or also to the impression of the counter, as well as the exact positioning of the counter via the key structures on the blank, relative to the coordinate system of the machine tool.

By milling the duplicate, the machine shows in which position it is machining the workpiece. By using the counter, the workpiece is then fixed in exactly that position.

With this knowledge, it is possible to convert the design into tool coordinates, which enables defined machining of the workpiece exactly in the intended locations.

Another way of mapping the coordinate systems of the machine tool, the design (CAM data), and the workpiece to one another is to perform a scan of the workpiece when it is placed in the machine tool on a blank, while reference marks or reference features are previously applied in defined positions on the workpiece and key features (key structures) are applied to the blank. Here, the key structures are always generated by the machine tool so that they correspond to predetermined coordinates of the machine tool. The reference marks on the workpiece make it possible to precisely identify the position of the workpiece in the scan. Alternatively, significant features of the workpiece itself can be used. However, this often leads to a lower precision in the recognition of the position of the workpiece in space and to an increased computational effort.

Depending on its realization, the method according to the invention offers at least one of the following advantages and in preferred embodiments even all of these advantages:
- It can be performed with mobile intraoral scanners: Such scanners are available in dental practices with digital equipment, thereby offering a financial advantage
- Higher precision
- Temperature independence
- Machine independence
- No structural modification of the machine is necessary (financial advantage, among others)
- Easier handling

BRIEF DESCRIPTION OF THE DRAWINGS

The invention is further explained by means of exemplary embodiments with reference to figures showing.

DESCRIPTION OF THE PREFERRED EMBODIMENTS

First Exemplary Embodiment

According to the first embodiment, a tool is produced which allows a dental prosthesis or generally a workpiece to be arranged in a machine tool in such a way that its position exactly corresponds to an existing, numerical design. The design can be revised for adjustments or modifications, after which the changes are made under numerical control with the aid of a machine tool exactly at the specified locations on the real object.

Figures 1, 2:
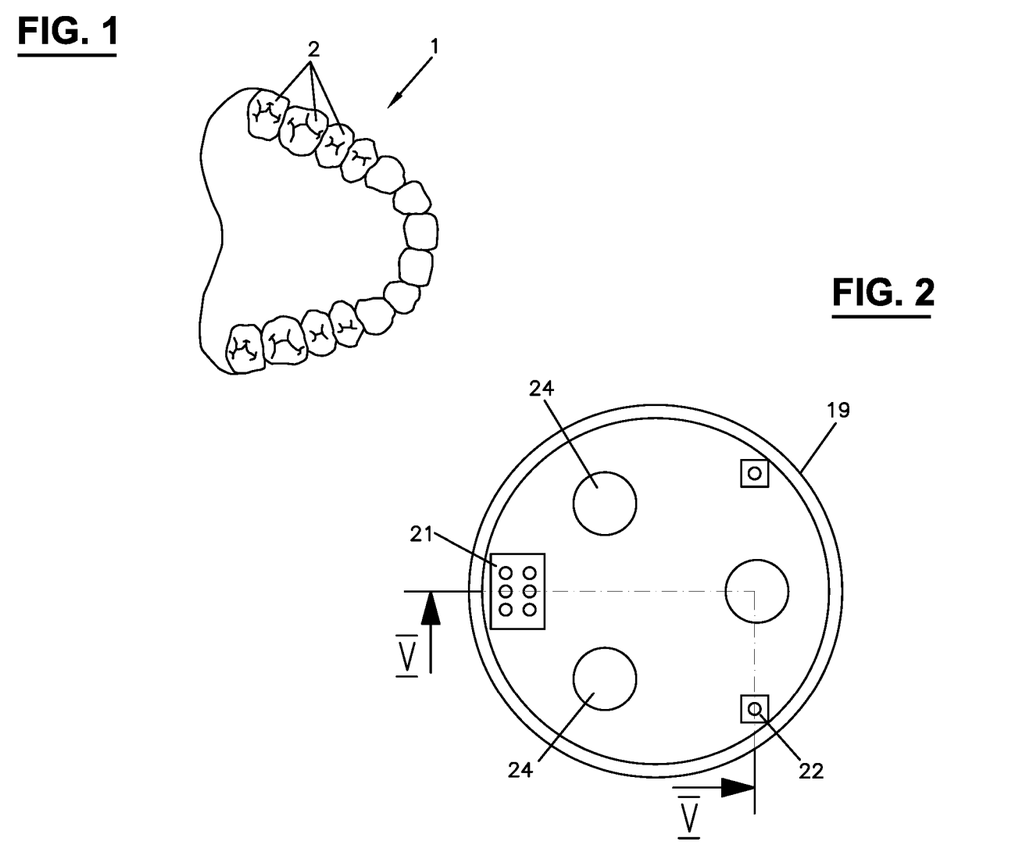
FIG. 1 top view of a dental prosthesis as a prototype of a workpiece.
FIG. 2 view from below of a support plate for a counter (counter piece)
Figure 3:
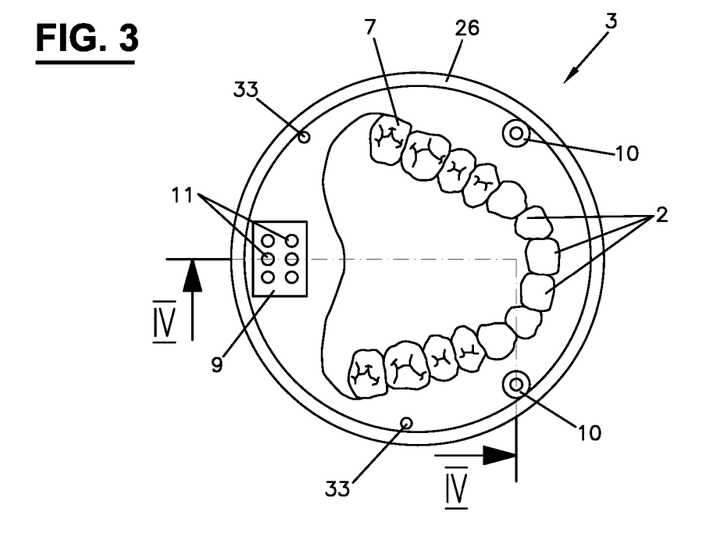
FIG. 3 top view of a blank (base) with a workpiece (dental prosthesis)

A dental prosthesis 1 with teeth 2 (partially marked with reference numerals) shown by way of an example in FIG. 1 is scanned and recorded in a suitable design program. By means of the design program, the required modifications to the digital image of dental prosthesis 1 can be planned. In a machine tool, a blank 3 is created (additive or subtractive manufacturing). Blank 3 comprises a platform 5 on which a partial copy 7 of dental prosthesis 1 is produced. Only the structures for referencing or for fixing it in the counter are necessary: usually the occlusal surfaces of the prosthetic teeth. Outside the area of dental prosthesis 7, key structures 9 and 10 are also produced by the machine tool that produces duplicate 7. Key structure 9 essentially consists of an arrangement of circular studs 11 (here six studs) similar to known plug-in blocks.

Blank (base) 3 consists of a dimensionally stable material and, in particular, a material that serves as a component of the workpiece after machining. The material may e.g. be pink plastic material, often PMMA or another physiologically acceptable polymer or base material, used as a relining material in dental prostheses. Also conceivable is steel, plastic material, titanium, model casting, especially fiber-reinforced plastic material, and ceramic material. Furthermore, it may comprise the necessary provisions (not shown here), such as grooves, holes, etc., that are needed to mount it in a machine tool, preferably in a precisely defined position.

Obviously, a complementarily formed counter piece can be plugged on, whereby a very precise positioning of the counter piece can be achieved also with respect to rotational movement. The second type of key structure 10 shows an alternative, several (here two) of which are produced on the blank, which individually still permit freedom of movement of an attached, complementarily formed mating key, but as a whole also achieve a precise positioning. Here, circular cylindrical studs 11 are shown, but at least one additional key structure that is spaced from the other one is advantageous to increase positioning accuracy.

Various shapes of key structures 9 and 10 are possible which deviate from those shown.

As will be explained below, it is essential that a counter piece placed thereon can be attached in exactly one position and without a possibility of further movement. Instead of circular-cylindrical studs, polygonal shapes or any shapes that deviate from the circular shape, such as elliptical and oval, are obvious. Instead of studs, recesses, i.e. bores, can also be provided, in which case the counter piece must accordingly have correspondingly shaped elevations instead of recesses, or vice versa.

The number of studs is not decisive. Possible are at least 2 (since two studs already prevent not only a displacement but also a rotation), 3, 4, 5, 6, 7, 8 and more studs, or also an irregular configuration which essentially only allows one position relative to a counter piece, however. Also conceivable are studs that do not have a circular cross-section, such as an elliptical, oval, egg-shaped, polygonal one (preferably triangular to hexagonal, in order to still obtain pronounced corners and thus a high resistance to twisting, while higher numbers of corners are conceivable in principle, but form a transition to the properties of a stud having a circular cross-section), and which already prevent twisting about the vertical axis of the stud individually. An arrangement of at least 2 studs is preferable in order to prevent a rotation, and a plurality of studs offers in principle a higher precision of the positioning on a counter piece due to a larger ratio between the effective area of the key structure (stud arrangement) and the total area of the blank or prosthesis, or the maximum diameter (e.g. the distance of the centers [centers of gravity] of the studs arranged furthest apart) of the key structure to the largest diameter of the prosthesis or blank as a whole (here, due to the circular shape: its diameter). Accordingly, the arrangement of more than one key structure, here prototypically of key structure 9 and of simpler key structures 10, also serves to increase this ratio and thus to achieve a more precise positioning.

Figure 4:
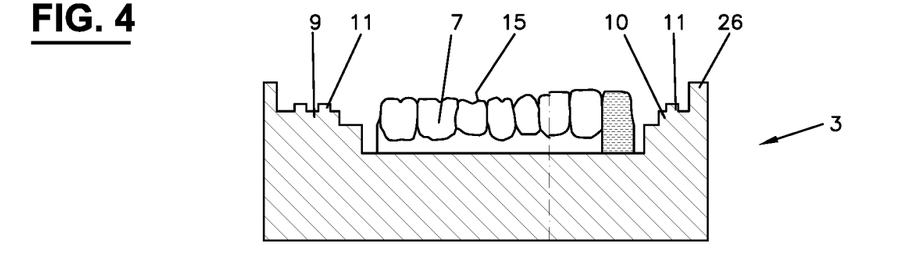
FIG. 4 section according to IV-IV in FIG. 3.

Also, the prosthesis or generally the workpiece does not have to be completely duplicated; on the contrary, it is sufficient to form a sufficiently large number of significant parts so that the original part can be precisely and unambiguously positioned in an impression made of the duplicate. As can be seen in FIG. 4, these can be a sufficiently large number of occlusal surfaces of duplicate 7 or of dental prosthesis 1, in particular. Obviously, those areas which are intended for machining cannot be used.

Figure 5:
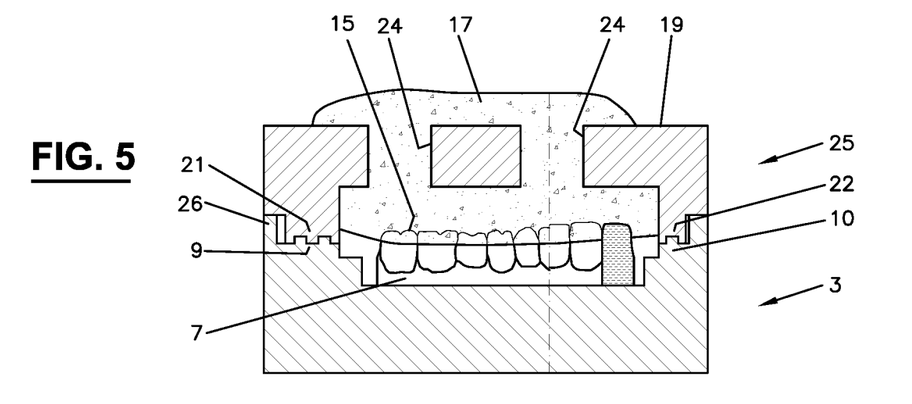
FIG. 5 section according to V-V in FIG. 2 and IV-IV in FIG. 3 after forming the workpiece negative (prosthesis impression)

A suitable casting compound 17 (gypsum; thermoplastic or permanently curable (e.g. by crosslinking) polymer material) and a referencing key holder 19 are applied to blank 3 (see FIG. 5).

Referencing key holder 19 (see FIG. 2) has key structures 21, 22, on one hand, which are complementary to key structures 9, 10 of the blank. Openings 24 serve to anchor the cured impression to reference key holder 19 by means of impression material 17 passing therethrough. After the impression material 17 has cured, a so-called counter 25 or counter piece is created, which essentially consists of reference key holder 19 and the hardened impression material 17 and has on its surface, at least in parts, an exact (negative) image 20 of the surface of the duplicate 7. As shown in FIG. 4, reference key holder 19 abuts against the blank, and particularly key structures 9, 10 or 21, 22 engage in one another, so that counter 25 can be reattached to the blank in exactly the same position. In the figure it is made clear that the distance is determined by the height of rim 26 so that although the key structures must be sufficiently high to engage in one another, they do not determine the distance between blank 3 and reference key holder 19.

It is conceivable, however, that key structures 9, 10 and 21, 22 also define the distance between blank 3 and reference key holder 19, i.e. that they abut against each other. However, rim 26 can then still be present as a circumferential elevation, e.g. to prevent a fixing agent 29 (see below) from leaking out of blank 3.

Regarding the material of the reference key holder, the same considerations apply as those made for blank 3 above.

Figure 6:
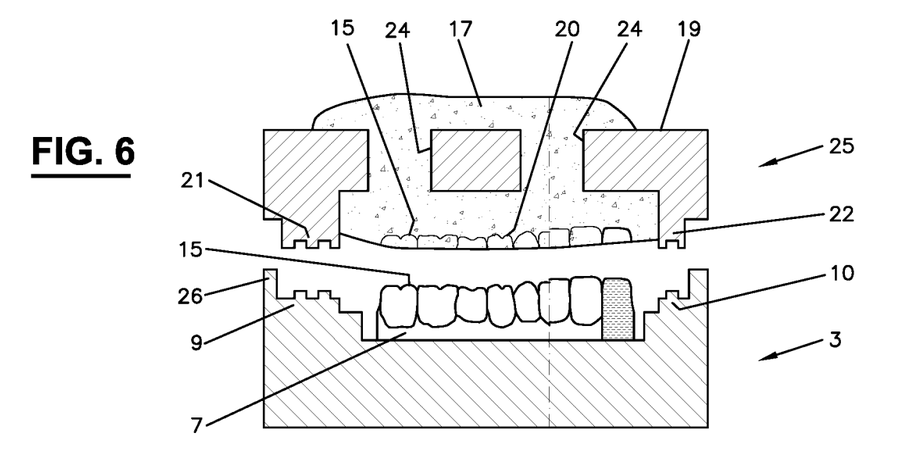
FIG. 6 section as in FIG. 5, with impression lifted from blank.

FIG. 6 shows counter 25 lifted off from blank 3.

Figure 7:
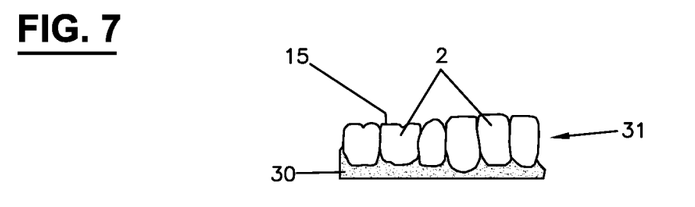
FIG. 7 lateral view of a reduced prosthesis.
Figure 8:
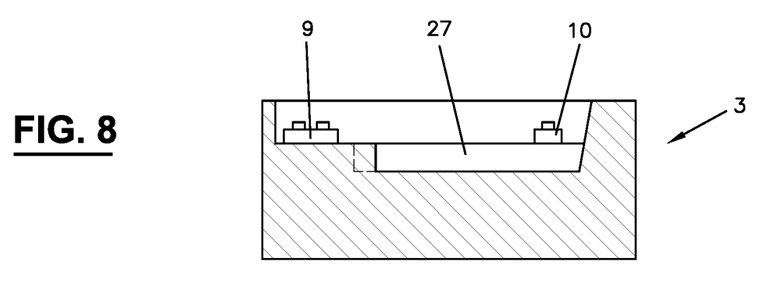
FIG. 8 section through a blank according to VIII-VIII in FIG. 13, with space for prosthesis exposed.

Duplicate 7 is removed so as to obtain a free space 27 for receiving dental prosthesis 1. A flowable material 29 is introduced into free space 27 in a suitable quantity. This material 29 can be a construction material that is used to form a part of prosthesis 1 later on. Another suitable material which is suitable for pressing prosthesis 1 against impression 20 in counter 25 is also conceivable. Here, by way of an example, dental prosthesis 1 is reduced up to teeth 2, as shown in FIG. 7, i.e. all of the relining impression material is removed in any case. The reduced prosthesis, which is milled flat at the bottom, can be fixed to blank 3 by means of an adhesive being used as a fixing agent 29, which itself serves as the material of the dental prosthesis. Blank 3 is also made of an imitation material. Known for this purpose is polymethyl methacrylate that is suitably colored to serve as an imitation gingiva. By attaching counter 25, prosthesis 1 is fixed in the position determined by impression 20 before the fixing agent solidifies and thus fixes the prosthesis to blank 3.

Also, on blank 3, a larger quantity of gingiva imitation material can be filled as a fixing agent 29 into free space 27 in excess and the (reduced) prosthesis 31 is placed on it. Counter 25 is placed thereon, whereby the reduced denture 31 is pressed into fixing agent 29, which then also serves as the raw material for the imitation gingiva on the dental prosthesis.

Fixing material in a larger layer thickness generally serves to press the prosthesis against and even into the impression material, compensating for deviations of the abutting surfaces, and to hold it there until the fixing agent has solidified. Fixing agent 29 is at least viscous to knead-like. Also conceivable is a thixotropic material or another material which loses viscosity or at least liquefies sufficiently under an external influence such as a mechanical load, e.g. vibration or displacement, or when heated or irradiated, and returns to a solid state by itself. Frequently, and especially when the fixing agent forms part of the processed prosthesis, an irreversible hardening or solidification is carried out, e.g. a polymerization or cross-linking. The latter can be achieved by heating, irradiation (electromagnetic radiation such as light, microwaves, X-rays, corpuscular radiation (elementary particles such as electrons) or combinations thereof. Time-controlled curing by delayed activation of an added catalyst for polymerization is also conceivable.

Figure 9:
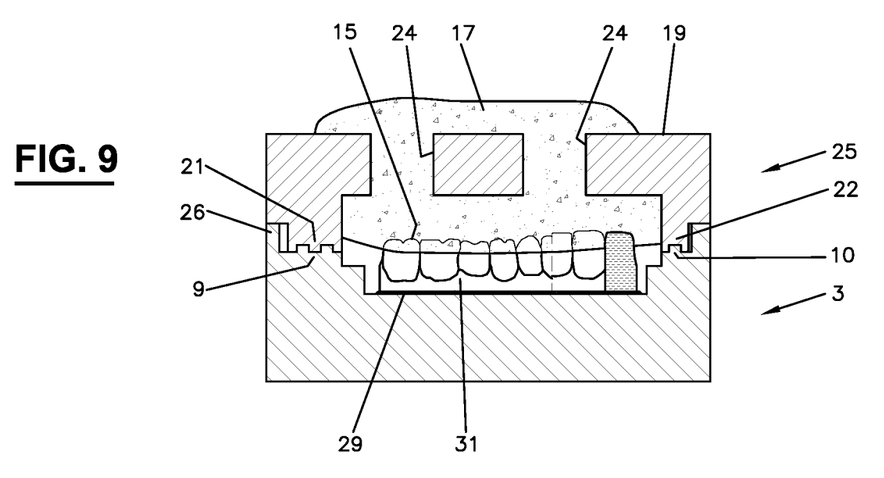
FIG. 9 illustration in analogy to FIG. 6, with real workpiece (dental prosthesis) inserted in holder according to FIG. 8 and counter piece with impression placed thereon.

As shown in FIG. 9, on the one hand, prosthesis 1 is now in a precisely defined position on counter 25 due to the exact fit on impression 20, here by at least part of the occlusal surfaces 15, and on the other hand, also counter 25 itself is in a precisely defined position due to the exact fit of key structures 9, 11 or 21, 22 relative to blank 3. All in all, dental prosthesis 1 is thus in the exact position in which duplicate 7 of dental prosthesis 1 was produced on blank 3.

For further processing, according to a conceivable variant, counter 25 together with the reduced dental prosthesis temporarily fastened thereto in a suitable manner and the polymer material adhering thereto, i.e. the fixing agent 29, which however has no particular adherence to blank 3 here, can be lifted off blank 3 and positioned in a machine tool by means of reference key holder 19. The attachment of prosthesis 1 to counter 25 can e.g. be achieved by means of an adhesive (generally an adhesion-promoting substance) which is previously applied to at least part of the contact zones between impression 20 and prosthesis 1. With regard to the strength of the adhesion promotion, at least such an area is to be covered that the requirements of subsequent processing steps are met. In the simplest case, the entire contact surface of impression 20 is provided with adhesive. The adhesive is suitably selected so as to be dissolved, weakened (e.g. by heating) or otherwise made sufficiently ineffective or destroyed after processing that the prosthesis can be removed from counter 25 without being damaged. Subtractive machining of the bonding surfaces by the machine (grinding) is also possible.

It is conceivable to remove the adhesive by the action of a solvent, e.g. by immersion in a solvent. Another possibility is a strong temperature change, i.e. heating or also cooling, in a temperature range in which the adhesive at least partially loses cohesion or adhesive force or both.

Preferably, however, counter 25 is lifted off after fixing agent 29 has cured. Blank 3 with prosthesis 1 is fixed in the machine tool for machining in a manner known per se.

Since prosthesis 1 is now located in a position within the machine tool of which the coordinates are known within the machine tool, machining of the gingiva imitation can be performed without damaging the prosthesis.

If, on the other hand, a change is to be made to the occlusal surfaces 15 of dental prosthesis 1, fixing agent 29 can be designed as a stable connection to blank 3 which can be subsequently released. Due to the above-mentioned precise positioning of all parts according to FIG. 9, the prosthesis is now also precisely positioned on blank 3 and can thus be accurately machined in a machine tool since the coordinates of the scan of the prosthesis according to FIG. 1 can be converted into the coordinates of the machine tool.

If the exact arrangement of counter 25 or blank 3 with prosthesis 1 in the machine tool is problematic, it is possible to attach them to the machine tool without exact positioning. If the nominal position of key structures 9,10 or 21, 22 in machine coordinates is not known or the key structures are not suitable for precise positioning, e.g. by scanning, machine reference marks 33 can be applied at predetermined positions, e.g. in the form of small holes. Afterwards, blank 3 or counter 25 is scanned. From the relative position of machine reference marks 33 and key structures 9, 10 or 21, 22, a mapping function of the design data to the machine coordinates can be created. As a result, it is thus possible to map the design data which were created using the scan of prosthesis 1 in FIG. 1 mentioned above, exactly to the real position of prosthesis 1 in the machine tool—prosthesis 1 is positioned in the carrier or counter 25 exactly at the position of the duplicate—and thus to precisely control the machine tool numerically for the intended machining operations on prosthesis 1.

Second Exemplary Embodiment

Figures 10, 11:
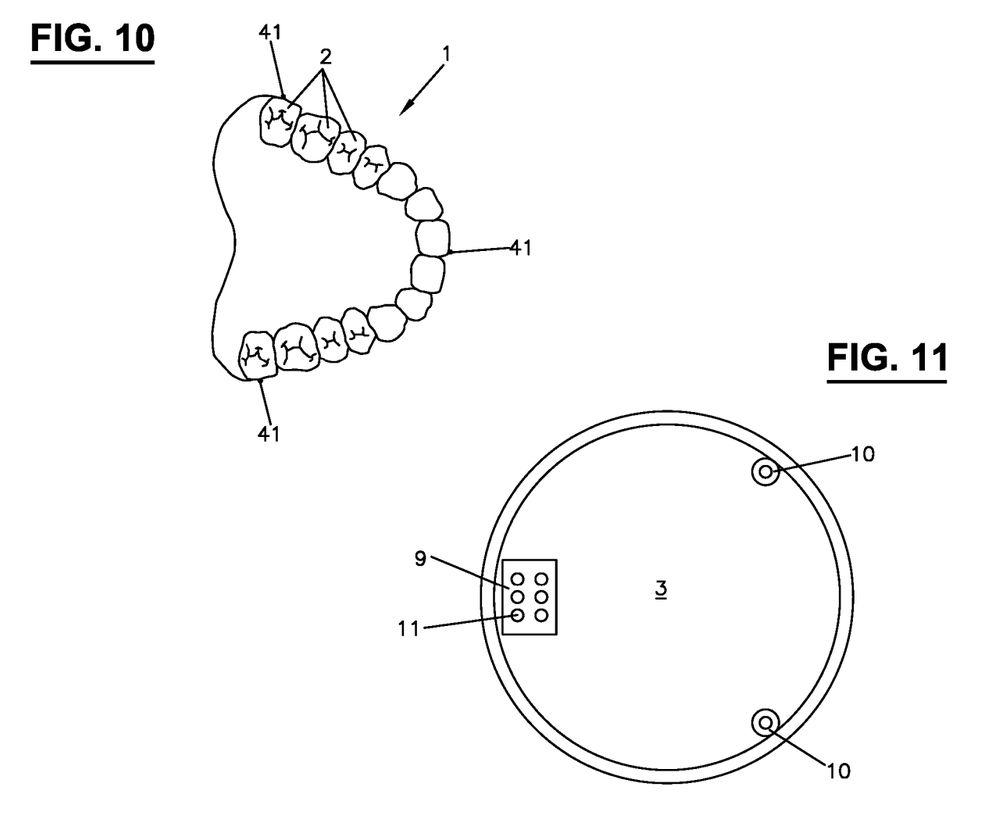
FIG. 10 top view of dental prosthesis with referencing beads.
FIG. 11 top view of blank platform with key structures.

As shown in FIG. 10, referencing bodies 41 (here: beads) are bonded to prosthesis 1, for example by means of wax. For reasons of precision, referencing beads 41 are attached at points as far apart as possible, in the example at one of the anterior teeth and at the rearmost molars. Beads, i.e. small balls, have the advantage that they can be affixed in any position and provide the same image from all spatial directions. However, other small bodies that are easily recognizable and whose spatial position can be precisely determined are also conceivable. They should be large enough to still be easily recognizable, but on the other hand small enough to be easily affixed and not to interfere with the further steps. Preferred sizes (diameters) are in the range of few millimeters, e.g. 1 mm-5 mm, preferably 1 mm. As a material for the beads, or bodies in general, one may be considered that is easily scannable, i.e. provides clear contrast and sharp contours. Depending on the background, white or black is advisable, possibly also a color that forms a high contrast to the background. A matte surface is advantageous to suppress reflections from the surroundings.

The referencing beads 41 (or more generally referencing bodies or reference marks) must obviously be placed at sufficiently different locations (preferably as far apart as possible) that they can be distinguished, i.e. that the length and position of a line in space that connects the spheres can be determined with sufficient resolution. In general, additional beads must not lie on an already existing connection between two beads or, in the case of at least 4 beads, in a plane formed by three other beads. Therefore, in general, a basic set of reference marks consists of features none of which is part of a geometric object (line, polygon) defined by any subset of the other reference marks. However, it is conceivable to affix additional, actually redundant beads which serve to increase the measurement accuracy, e.g. by averaging, or as a safety in case one of the beads falls off.

It is conceivable to use a surface section of the prosthesis that is sufficiently characteristic to be recognized and precisely localized by image recognition methods as a reference mark.

Prosthesis 1 with reference beads 41 is scanned. Based on the scanned data, which allows creating a virtual duplicate, the required machining steps are determined in suitable design software such as a CAM system. Essentially, a virtual image (see FIG. 12) of blank 3 with prosthesis 1, i.e. the workpiece, and additionally of key structures 9, 10 as well as of reference bodies 41 is created. The machining steps are defined based on this image.

A blank 3 (FIG. 11) is provided with key structures 9, 10 in the machine tool. In contrast to the first embodiment, however, the key structures serve as machine reference marks for determining the position of the coordinate system of the machine tool, since they are formed at the locations corresponding to data specified by the CAM system. Preferred structures are those that are readily visible in a scan and allow high precision in determining the position. In addition to the shapes shown by way of example, which essentially correspond to those of the first example, such a machine reference mark can simply consist of a hole (diameter e.g. at most 5 mm, preferably at most 3 mm). Elevations may also be advantageous, e.g. conical or pyramidal ones, in which case the respective apex can be determined more precisely by cutting the flanks. For a better differentiation, arrangements or different types can be used, such as structure 9 in the figures, which is different from structures 10.

Figure 14:
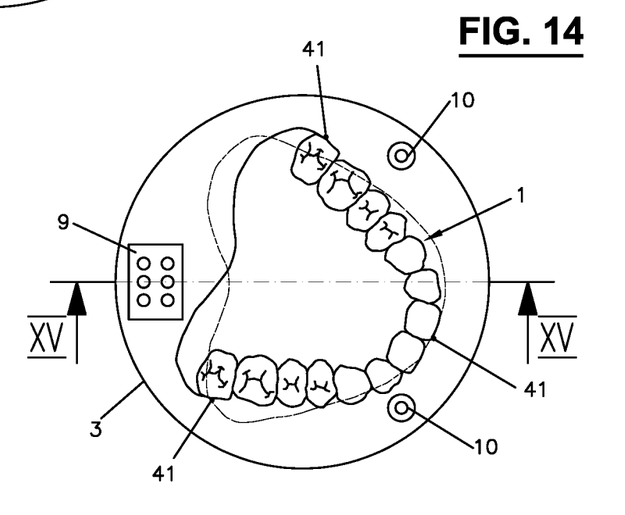
FIG. 14 top view of blank according to FIG. 13 with inserted prosthesis, ideal position according to FIG. 12 dashed.

If necessary, blank 3 is provided with an exposed surface 43 on which dental prosthesis 1 can be placed (see FIG. 14).

Figure 12:
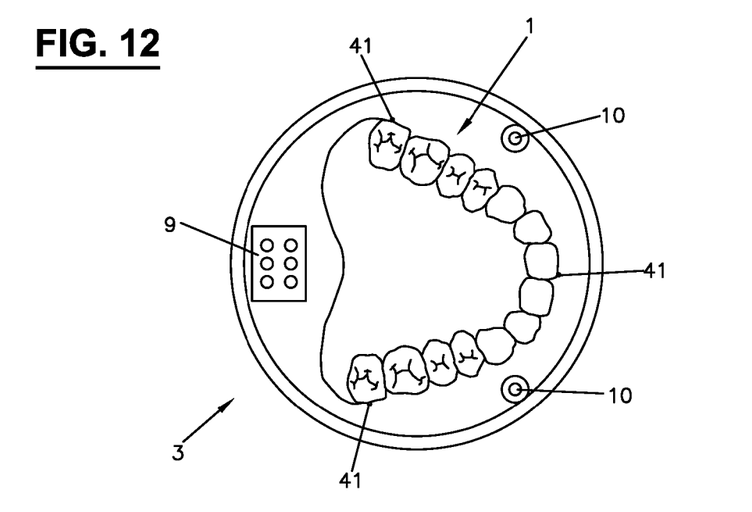
FIG. 12 virtual blank with workpiece.
Figure 13:
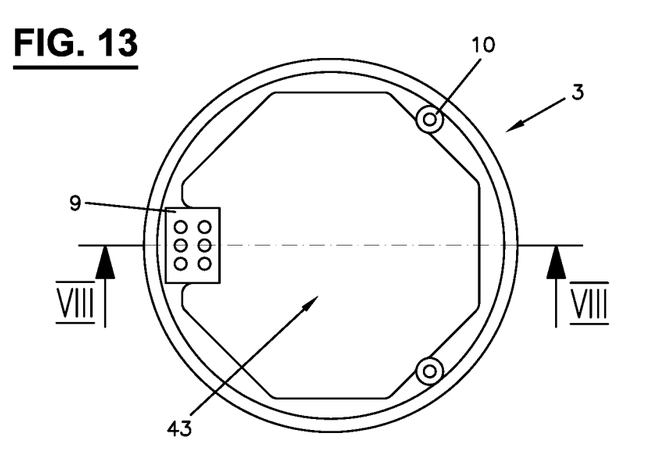
FIG. 13 top view of blank with recess for a prosthesis.

Prosthesis 1 is attached to the blank as in the first embodiment, either in surface 43 or after the removal (e.g. by milling) of duplicate 7 as shown in FIG. 12.

Figure 15:
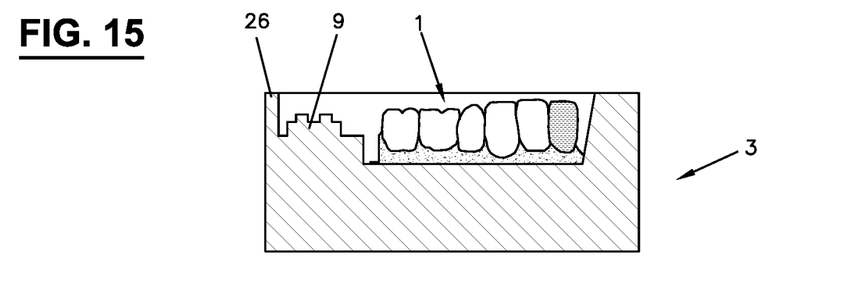
FIG. 15 section according to XV-XV in FIG. 14.

Dental prosthesis 1 is attached to surface 43 in an upright position, as shown in FIG. 15, or alternatively with its underside facing upwards, depending on whether the top or the underside needs to be machined, or counter 25 is used as described above in order to be able to machine the underside.

Figure 16:
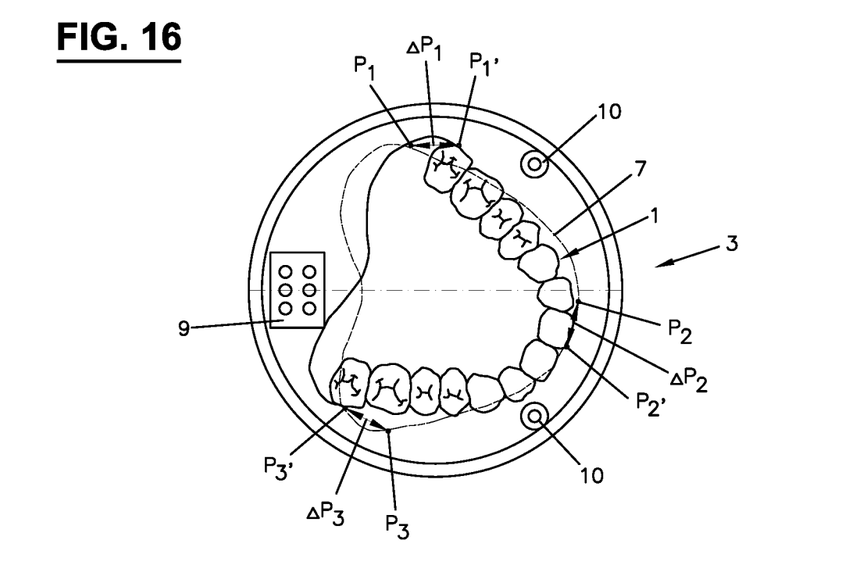
FIG. 16 top view in analogy to FIG. 14 with indication of reference points (schematized).

As shown in an exaggerated manner in FIG. 14, the position of the prosthesis on blank 3 will certainly not correspond, or at least not exactly enough, to the position according to the design (see FIG. 12), which is indicated in a broken line as the contour of duplicate 7. However, the position of prosthesis 1 on blank 3 can now be detected by a new scan, in particular of referencing beads 41. As shown in FIG. 16, the respective displacements $\Delta P1$, $\Delta P2$, $\Delta P3$ of the construction points (here three, namely P1, P2 and P3) can now be determined in relation to the positions (P1', P2', P3') measured on the real prosthesis 1. With the boundary condition that the size of the design, i.e. the position of points P1-P3 or P1'-P3' relative to each other is identical, three points are sufficient to convert the design to the position of the real prosthesis according to 14.

This can be imagined schematically e.g. by the following procedure:
1. Point P1 is moved to P1';
2. There follows a rotation around an axis through P1' (is equal to P1), the axis of rotation being perpendicular to a triangle formed by P1', P2, and P2'. This rotation turns point P2 to P2' so that P2 equals P2' after this operation;
3. A rotation follows around an axis through P1' and P2', whereby P3 is moved to P3'.

Changes perpendicular to the drawing plane, i.e. in reality to the surface of platform 5, are also taken into account—the position differences ΔP1, ΔP2, ΔP3 can therefore also contain a component perpendicular to the drawing plane.

Different scales while scanning prosthesis 1 according to FIG. 10 and prosthesis 1 on blank 3 according to FIG. 14 can be taken into account by determining the distances between the reference beads and setting them in relation to each other. In this respect it is assumed that the different scale applies in all spatial directions.

The aforementioned methods allow the required precision to be maintained at least for the finishing of dental prostheses. As a rule, they provide a determination of the processing coordinates with a tolerance of approx. 30 μm (0.03 mm) nowadays. A deviation of at most 0.5 mm can be regarded as the lower limit of processing accuracy; deviations of at most 0.2 mm and in particular 0.1 mm are better and more suitable for practical use.

An interesting application of this method in order to allow reworking a prosthesis or more generally a workpiece without damaging it, is its use in manufacturing. Particularly in additive machining processes (3D printing), there is a large price differential between machine tools that have the required final precision and those with unacceptably high tolerances. With the aid of the above method, it is conceivable to first manufacture a workpiece, in particular a dental or other model, by means of a machine tool of lower precision and corresponding oversize and then to finish the product in a machine tool, usually a machine tool of subtractive manufacturing such as a milling machine, whereby the exact position of the workpiece in the milling machine is determined by means of the present method.

The data processing steps in the preceding description are preferably performed in an automated manner on a computer or processor based on a program. In particular, this applies to the conversion of the scanned images to the representation of the CAM system and the conversion of the CAM data to the coordinate system of the real prosthesis or the real workpiece in the position it occupies in the blank and in the machine tool.

From the foregoing description of the exemplary embodiments, a wide variety of variations and complements are accessible to one skilled in the art without departing from the scope of protection of the invention, which is defined by the claims. Some conceivable variants are mentioned in the description of the exemplary embodiments.

It is also conceivable that:
The invention is applied to the finishing of workpieces of any kind.
The blank does not become part of the workpiece and thus exclusively serves as a base. It can therefore be made of a material that makes it more suitable as a workpiece holder in the machining process used.

The spacing of the key structures or machine reference marks is at least ⅓ of a largest diameter of the workpiece in projection onto the blank or base.

In methods prototypically represented by the second embodiment, in particular, one to all key structures are not formed spatially, but two-dimensionally or essentially one-dimensionally, e.g. printed structures such as color marks, line structures, geometric figures and mixed forms thereof. However, in methods analogous to the first exemplary embodiment, such key structures in the broader sense presumably require a higher effort in order to align the counter and the blank exactly to each other by means of the key structure by moving them relative to each other until the predetermined relative position of the key structures is reached.

The invention claimed is:

1. A method for positioning a workpiece in a numerically controlled machine tool, wherein
    on a blank serving as a base, a duplicate comprising at least part of the workpiece is formed by the machine tool under the control of first data,
    at least one key structure is formed in a positioning section of the blank,
    a counter piece comprising an impression compound is placed on the base, the at least one key structure of the blank and a respective complementarily formed key structure on the counter piece being brought into engagement with each other so that the base and the counter piece are in a predetermined relative position to one another and a negative of the surface of the duplicate is formed in the impression compound, and the duplicate is removed from the base,
    so that the counter piece can be reproducibly attached to the base in the same relative position and the workpiece can be reproducibly attached to the blank in a position corresponding to the first data by fitting the workpiece into the negative.

2. The method according to claim 1, further comprising subsequent steps of:
    placing the workpiece on the base at the location of the removed duplicate,
    attaching the counter piece with the at least one key structure of the base engaging the at least one key structure on the counter piece while aligning the workpiece so that the portions of the workpiece that correspond to the portions of the duplicate are negatively formed in the negative fit into the negative,
    in order to place the workpiece on the base in the same position as the duplicate.

3. The method according to claim 2, further comprising steps of:
    providing, prior to placing the workpiece on the base, at least one of an effective portion of the negative and an effective portion of the area of the workpiece that corresponds to the negative with an adhesion-promoting layer so that the workpiece adheres to the negative with sufficient strength to be machined on a portion that is not covered by the negative.

4. The method according to claim 3, wherein the workpiece is attached to the base by means of an adhesion-promoting material and the adhesion-promoting material is solidified to form a bond between the base and the workpiece.

5. The method according to claim 2, wherein the workpiece is attached to the base by means of an adhesion-promoting material and the adhesion-promoting material is solidified to form a bond between the base and the workpiece.

6. The method according to claim 5, wherein the adhesion-promoting material is suitable to form a part of the workpiece.

7. The method according to claim 2, wherein the at least one key structure on the base is formed on the base outside the area occupied by the workpiece.

8. The method according to claim 1, wherein the key structures of the base and the counter piece are designed such that when the base and the counter piece are separated and reconnected, a maximum displacement of 0.5 mm of the workpiece or the duplicate is not exceeded before and after their separation and reconnection.

* * * * *